United States Patent
Jiang et al.

(10) Patent No.: US 7,203,411 B1
(45) Date of Patent: Apr. 10, 2007

(54) THERMOOPIC TYPE VARIABLE OPTICAL ATTENUATOR AND ARRAY TYPE VARIABLE OPTICAL ATTENTUATOR USING THIS

(75) Inventors: Xiaoqing Jiang, Hangzhou (CN); Yuying Wu, Matsudo (JP); Minghua Wang, Hangzhou (CN); Guanming Lai, Hangzhou (CN)

(73) Assignee: Seikoh Giken Co., Ltd. (JP)

( * ) Notice: Subject to any disclaimer, the term of this patent is extended or adjusted under 35 U.S.C. 154(b) by 0 days.

(21) Appl. No.: 10/568,062

(22) PCT Filed: Aug. 10, 2004

(86) PCT No.: PCT/JP2004/011481

§ 371 (c)(1),
(2), (4) Date: May 3, 2006

(87) PCT Pub. No.: WO2005/017610

PCT Pub. Date: Feb. 24, 2005

(30) Foreign Application Priority Data

Aug. 13, 2003 (JP) .............................. 2003-292864

(51) Int. Cl.
*G02B 6/26* (2006.01)
*G02B 6/42* (2006.01)

(52) U.S. Cl. .......................... 385/140; 385/28; 385/29; 385/43

(58) Field of Classification Search .................... 385/2, 385/8, 14, 27–29, 43, 140
See application file for complete search history.

(56) References Cited

U.S. PATENT DOCUMENTS 6,707,969 B2 * 3/2004 Kim ............................. 385/45
6,728,438 B2 * 4/2004 Kwang Bae .................. 385/28
6,868,222 B2 * 3/2005 DePue et al. ................ 385/140
2003/0133663 A1 7/2003 Orignac et al.
2005/0175281 A1 * 8/2005 Thapliya et al. .............. 385/28

FOREIGN PATENT DOCUMENTS

| JP | 04-282602 | 10/1992 |
| JP | 2002023123 | 1/2002 |
| JP | 2002-162654 | 6/2002 |
| WO | WO 02/31587 A2 | 4/2002 |

OTHER PUBLICATIONS

Noh, Y.O., et al., "PLC-Type Variable Optical Attenuator Operated at Low Electrical Power," Electronics Letters, vol. 36, No. 24 (Nov. 2000) p. 2032-2033.
International Search Report, Nov. 22, 2004.
Noh, Y. O., et al., "PLC-Type Variable Optical Attenuator Operated at Low Electrical Power," Electronics Letters vol. 36, No. 24 pp. 2032-2033.
Yang, M. S., et al., "Very Low Crosstalk 1×2 Digitial Optical Switch Integrated with Variable Attenuators," Electronic Letters vol. 37, No. 9, pp. 587-588.

* cited by examiner

*Primary Examiner*—Hemang Sanghavi
(74) *Attorney, Agent, or Firm*—Carlson, Gaskey & Olds

(57) ABSTRACT

A thermo optical type variable optical attenuator suitable for application in an array type variable optical attenuator that realizes low crosstalk between neighboring waveguides in the array is provided. A thermo optical type variable optical attenuator 100 using optical material having negative optical effect provides a multimode optical propagating part 3 disposed via a tapered part 2 and a tapered part 7 between single mode optical waveguides 1 and 8. A thin-film heater 4 is disposed above the multimode optical propagating part 3 at an angle of inclination β in relation to the direction of light propagation along a first optical waveguide 50. Moreover, a second optical waveguide 9 optically coupled with a side face 3S1 of the multimode optical propagating part 3 is provided at an angle of inclination 2β in relation to the direction of light propagation along the first optical waveguide 50.

7 Claims, 8 Drawing Sheets

THERMOOPIC TYPE VARIABLE OPTICAL ATTENUATOR AND ARRAY TYPE VARIABLE OPTICAL ATTENTUATOR USING THIS

TECHNICAL FIELD

The present invention is in the field of high capacity multiple channel optical transmission systems and optical measuring systems and relates specifically to a thermo optical type variable optical attenuator that can adjust the strength of optical signals for each channel and an array type variable optical attenuator that uses this thermal optical type variable optical attenuator.

BACKGROUND ART

In recent years, in line with the rapid diffusion of the Internet, as one of the challenges involved with increasing the transmission capacity of optical transmission networks wavelength division multiplexing (WDM) has been achieved in which a plurality of signals having different wavelengths are multiplexed for transmission over a single fiber. Optical amplifiers, (e.g. erbium doped fiber amplifiers: EDFA) are essential for WDM systems, however as optical amplifiers normally have wavelength-dependent gain problems arise in connection with saturation in receiver and a deteriorating S/N ratio.

One means employed to resolve such problems is to provide a variable optical attenuator (VOA) at the input side of an optical multiplexer in a WDM system and adjust the signal level at each wavelength. To achieve this, it is preferable to have an array type VOA that uses VOA for each wavelength via a plurality of VOA arranged in parallel. Generally, the features of small input loss, non-polarization dependency, non-wavelength dependency and a wide variable range of attenuation quantity are desirable in a VOA. In the case of an array type VOA, low crosstalk between neighboring VOA in the array, low cost, compact size and low power consumption are also desirable.

Non-mechanical type VOA's that fulfill these requirements operate using electro-optical effects, electromagnetic optical effects and thermo optical effects (changes in refractive index due to temperature). In recent years there has been a focus on optical polymer materials in which changes in index of refraction in response to temperature changes are substantial, for providing a material for a VOA using thermo optical effects (thermo optical type VOA).

In comparison to silicon dioxide (SiO2: silicon), the thermo optical coefficient of optical polymer materials has a number of digits before decimal point greater than that of silicon dioxide by 1 and the rate of thermal conductivity is lower thereby enabling lower energy consumption and lower-cost production. Optical polymers such as organic and inorganic polymers derived from the sol-gel method, polymide resins, epoxy resins and acrylic resins and the like have a negative optical effect in which index of refraction decreases as temperature rises.

In terms of production of a thermo optical type VOA, if an optical polymer material having these effects is used formation of a thin-film by the spin coating method is easy, enabling production processes to be performed at low temperatures, thus there is no necessity to limit the size of a substrate produced so a large area substrate can be produced and the layering of clad layers and core layers that comprise a thermo optical type VOA can be achieved more easily. Further, the spin coating method is not the only method available but a variety of different production methods can be employed bringing further expectations of increased scales of production and further cost reductions.

FIG. 1 is a skeleton plan view showing the configuration of a conventional thermo optical type VOA. In reference to this conventional thermo optical type VOA, refer to Japanese Unexamined Patent Application Publication No. 2002-162654, in the Nov. 23, 2000 issue of Electronics Letters, Vol. 36 No. 24 pages 2032–2033 and the Apr. 26, 2001 issue of Electronics Letters, Vol. 37 No. 9, pages 587–588.

In the thermo optical type variable optical attenuator 20 shown in FIG. 1, once power flows from the power supply 25 a heater 24 heats and the temperature of a heated part of a multi-mode optical waveguide 23 positioned under the heater 24 rises. As this happens, the refractive index of the heated part falls due to the negative optical properties of the optical polymer material comprising the thermo optical type variable optical attenuator 20. Accordingly, incident light φ10 (optical power P10) propagated along single mode optical waveguide 21 is conveyed to a tapered part 22, thereafter, this incident light φ10 excites higher order mode lights φ1 and φ2 at the above-mentioned heated part of the multimode optical waveguide 23. These excited, high order mode lights φ1 and φ2 are diffused around a multi-mode optical waveguide 23, optical leakage occurs and as a result, the output power (P11) of the single mode optical waveguide 27 attenuates (in other words P11<P10).

When an array type variable optical attenuator is configured consisting of a plurality of the above described thermo optical type variable optical attenuators 20 arranged in parallel, light the from each of the multimode waveguides couples with light in adjacent waveguides giving rise to problems due to variable range of attenuation quantity and crosstalk between adjacent waveguides (e.g. where the distance between adjacent waveguides is 250 μm crosstalk is approximately 34 dB).

DISCLOSURE OF THE INVENTION

With the foregoing in view it is an object of the present invention to provide a thermo optical type variable optical attenuator that reduces crosstalk occurring between adjacent waveguides caused by leakage due to diffusion of high order mode light excited at the part of an array type waveguide that is heated by a heater and enables an array type variable optical attenuator that realizes a broader variable range of attenuation quantity to be obtained easily.

As a means of solving the above described problems the thermo optical type variable optical attenuator related to the present invention is an attenuator that uses an optical material having negative optical effects, and comprises: a first optical waveguide further comprising a first single mode light propagating part that propagates incident light, a second single mode light propagating part that propagates output light, a multimode light propagating part disposed between the first and the second single mode propagating parts, a first tapered part disposed between the first single mode propagating part and the multimode propagating part, and a second tapered part disposed between the second single mode propagating part and the multimode propagating part; a thin-film heater arranged above the multimode light propagating part inclined at an angle β in relation to the direction of propagating of light output from the first optical waveguide; and a second optical waveguide further comprising a multimode light receiving part disposed on one side of the multimode light propagating part inclined at an angle 2β in relation to the direction of propagation of output light for receiving and bypassing high order mode light excited, diffused and emitted at the thin-film heater, and an output part that guides multimode light received at the multimode light receiving part in a direction parallel to the central axis of the second single mode light propagating part and emits that light.

The present invention provides a thermo optical variable optical attenuator having a first optical waveguide further comprising a multi-mode light propagating part disposed via a tapered part between a first single mode light propagating part for propagating incident light and a second single mode light propagating part for propagating output light, and a heater arranged above the multimode light propagating part, inclined at an angle β in relation to the direction of propagation of light through the first optical waveguide, wherein for high order mode light excited when electric current flows to this heater is emitted and attenuates a second optical waveguide is provided for emission and attenuation of this high order mode light, this second optical waveguide further providing a multimode light receiving part at one side of the multimode light propagating part for receiving high order mode light in a direction inclined at an angle 2β in relation to the direction of propagation of light along the first optical waveguide and an output part for guiding high order mode light received at the multimode light receiving part in a direction parallel to the central axis of the second single mode light propagating part and emitting that light, thus enabling control of the diffusion of the excited high order mode light around the multimode light propagating part. Accordingly, when there is an array type variable optical attenuator configured having a high density of thermo optical type optical attenuators according to the present invention arranged in parallel, the variable range of attenuation quantity can be increased and crosstalk occurring between waveguides in the array of optical waveguides due to coupling of light leaked from neighboring waveguides can be decreased.

It is preferable for the thermo optical variable optical attenuator according to the present invention to provide a triangular shaped auxiliary waveguide disposed in the V-shaped region where one side of the multimode light propagating part of the first optical waveguide and the second optical waveguide disposed in a direction inclined at an angle 2β on one side of that the multimode light propagating part intersect, for efficiently receiving and propagating the high order mode light. By providing a triangular shaped auxiliary waveguide at the multimode light receiving part of a second optical waveguide, high order mode light excited by the heater can be more efficiently taken in. This enables more efficient operation of the above described effect of controlling propagation of excited high order mode light around the multimode light propagating part.

It is preferable for the other side of the multimode light propagating part to form a notch made by removing a triangle, in order to reduce light propagation loss arising at the multimode light propagating part. By having the other side of the multimode light propagating part of a form of a notch made by removing a triangle, the length of the coupling of one side of the multimode light propagating part of the first optical waveguide and the multimode light receiving part of the second optical waveguide becomes smaller, thus, when current is not flowing to the heater, that is to say, when light attenuation is not required leakage of part of incident light to the multimode light receiving part of the second optical waveguide and attenuation of the incident light can be prevented, enabling an optical attenuator having a broader variable range of light attenuation quantity to be obtained.

It is preferable for one side of the multimode light propagating part of the first optical waveguide and the multimode light receiving part of the second optical waveguide to be separated having a determined interval therebetween to facilitate optical coupling. By disposing the multimode light propagating part of the first optical waveguide and the multimode light receiving part of the second optical waveguide with a determined interval therebetween so as to facilitate optical coupling, the above described effect of prevention of leakage of part of incident light to the multimode light receiving part of the second optical waveguide and unnecessary attenuation of the incident light, operates more effectively.

It is preferable for that determined interval to be 3 μm or below. When this determined interval is 3 μm or below the above described effect of prevention of leakage of part of incident light to the multimode light receiving part of the second optical waveguide and unnecessary attenuation of the incident light, operates more effectively.

It is preferable for the first tapered part of the first optical waveguide to have a parabolic form. Where the first tapered part of the first optical waveguide has a parabolic form the variable optical attenuator can be made more compact as the first tapered part can be of a shorter length.

It is preferable for the thermo optical type variable optical attenuator according to the present invention to be an array type variable optical attenuator having a plurality of the above described thermo optical type variable optical attenuators arranged in parallel. When this array type thermo optical variable optical attenuator having a plurality, arranged in parallel, of optical attenuators that provide a second optical waveguide for receiving high order mode light excited due to heating from the heater and bypassing that high order mode light, disposed on one side of the multimode light propagating part of the first optical waveguide, diffusion leakage of high order mode light excited by heating from the heater between adjacent waveguides, as well as deterioration due to crosstalk between waveguides and variation in the range of attenuation quantity can be suppressed. This enables a superior, high density array type optical waveguide to be realized.

BEST MODE FOR CARRYING OUT THE INVENTION

The embodiments of the present invention will now be described with reference to FIGS. 2 to 8.

Figure 1:
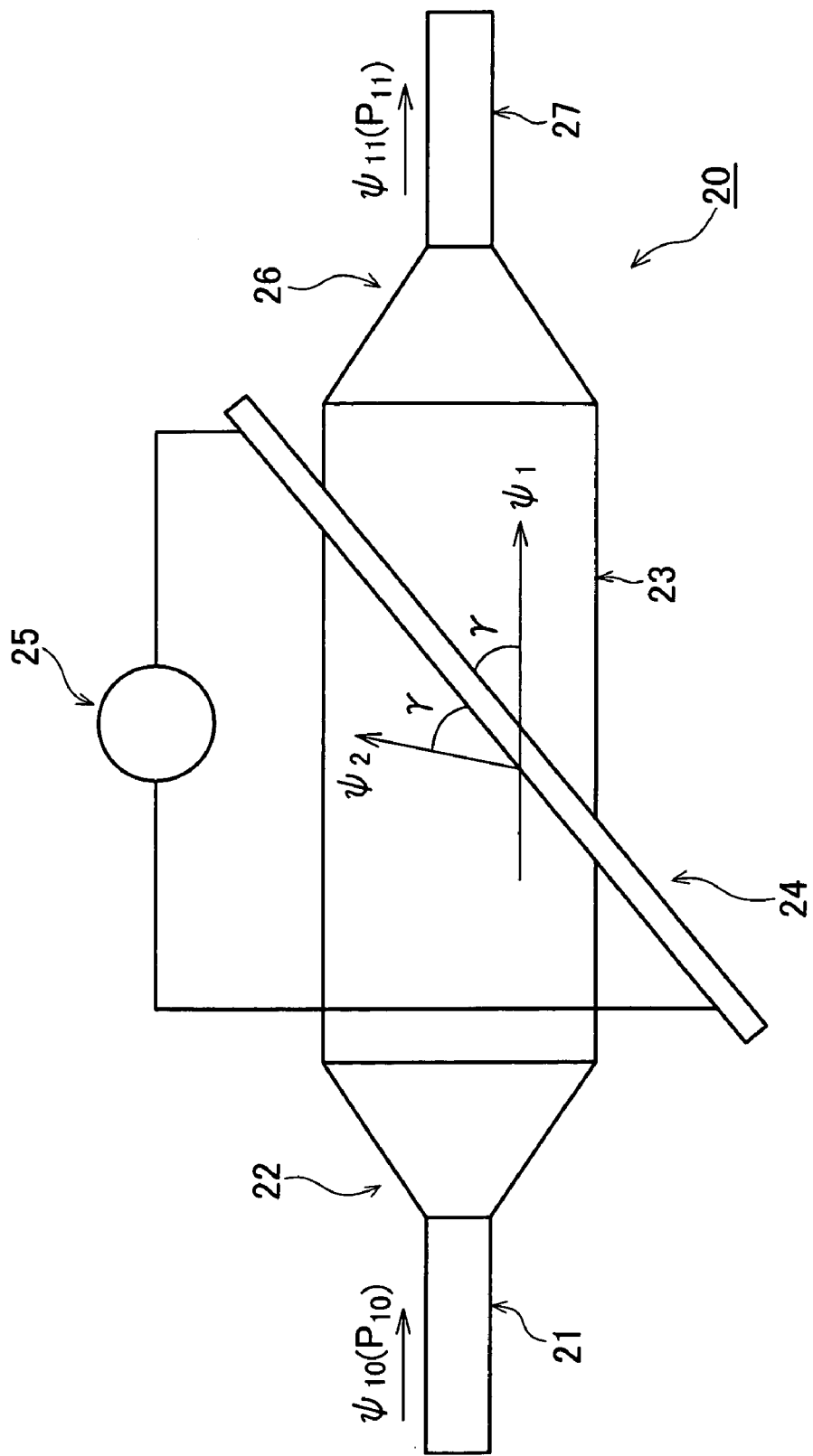
FIG. 1 is a skeleton plan view showing the configuration of a conventional thermo optical type variable optical attenuator.
Figure 2:
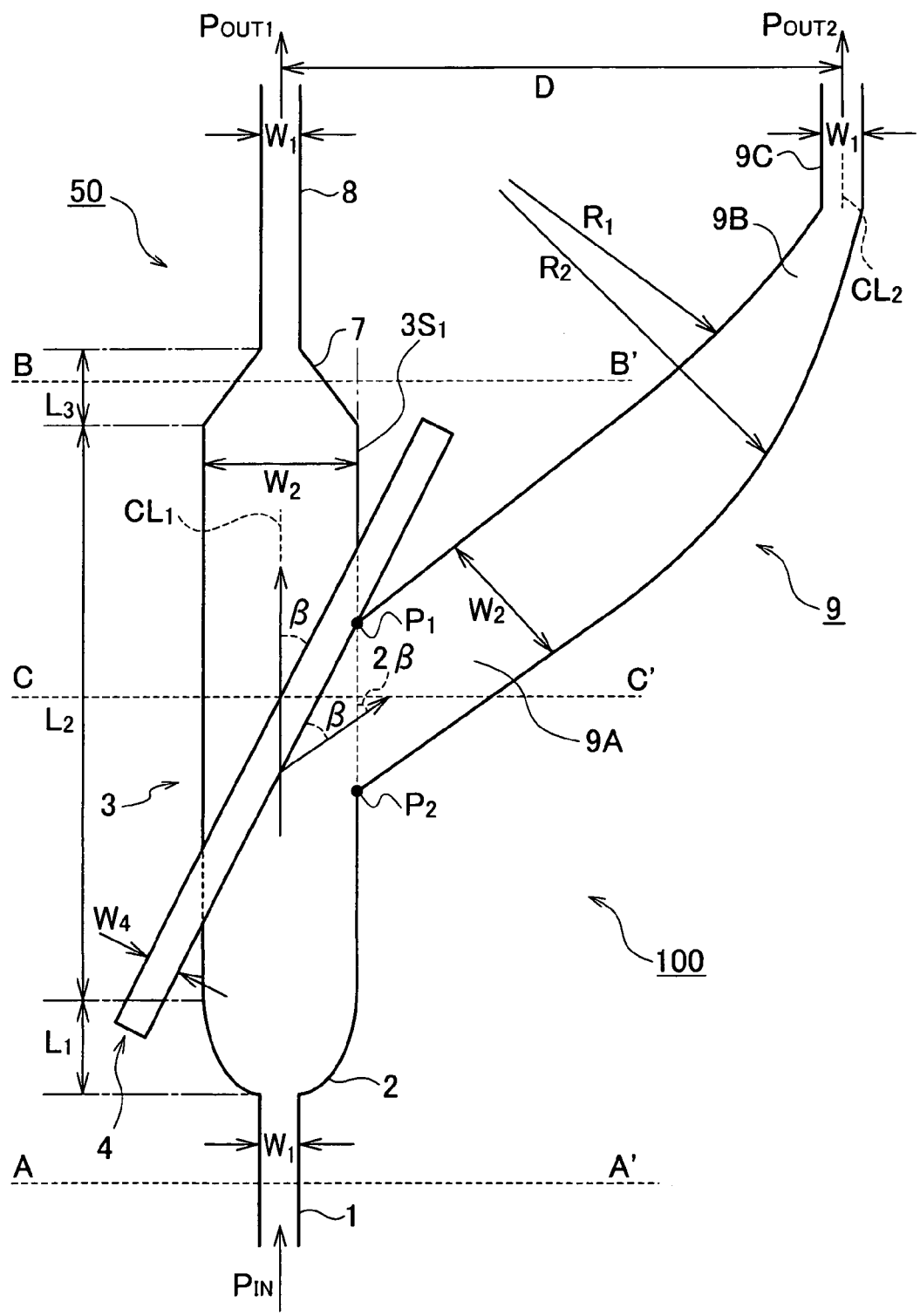
FIG. 2 is a skeleton plan view showing a thermo optical type variable optical attenuator according to a first embodiment of the present invention.
Figure 4:
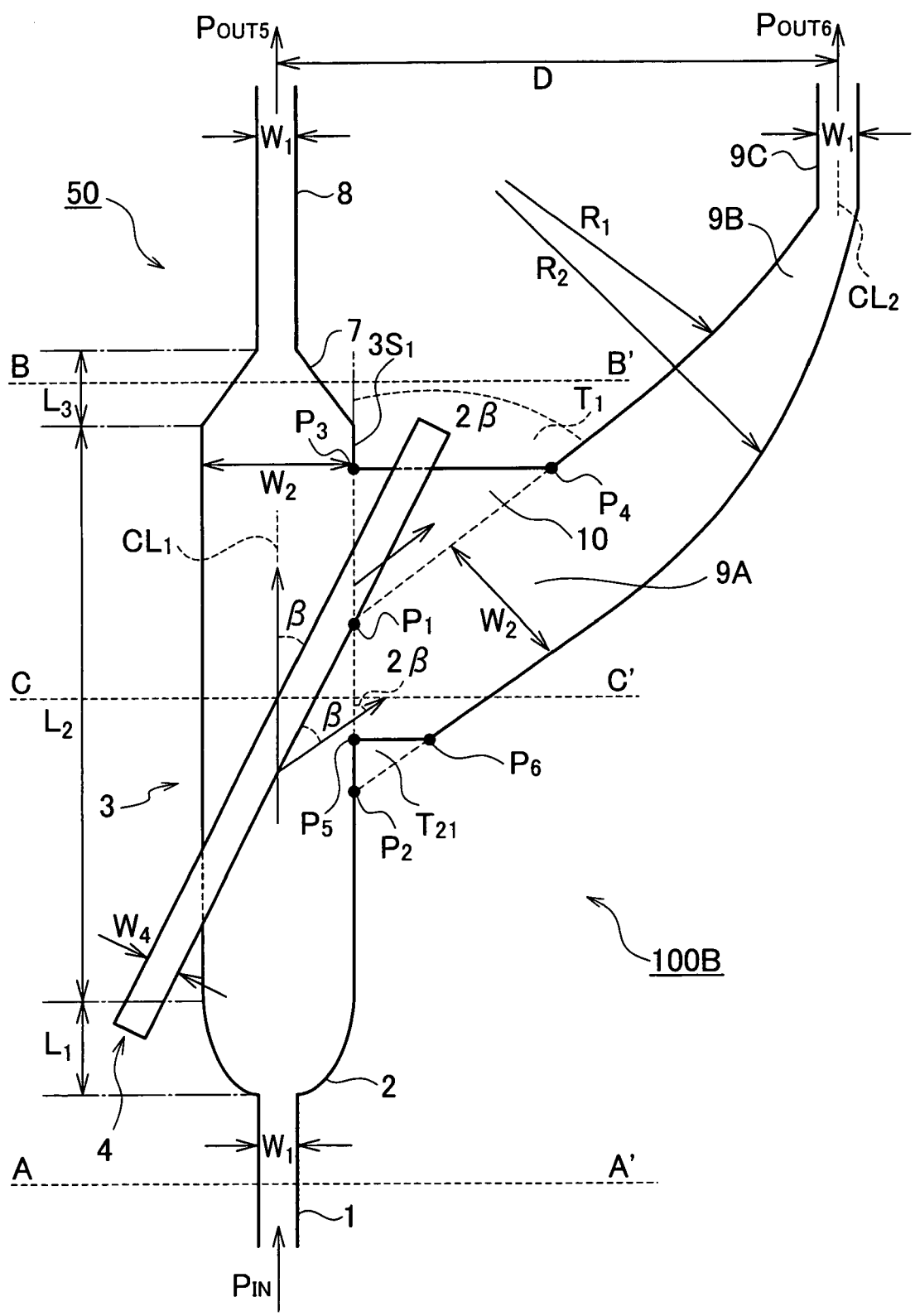
FIG. 4 is a skeleton plan view showing a thermo optical type variable optical attenuator according to a third embodiment of the present invention.
Figure 5:
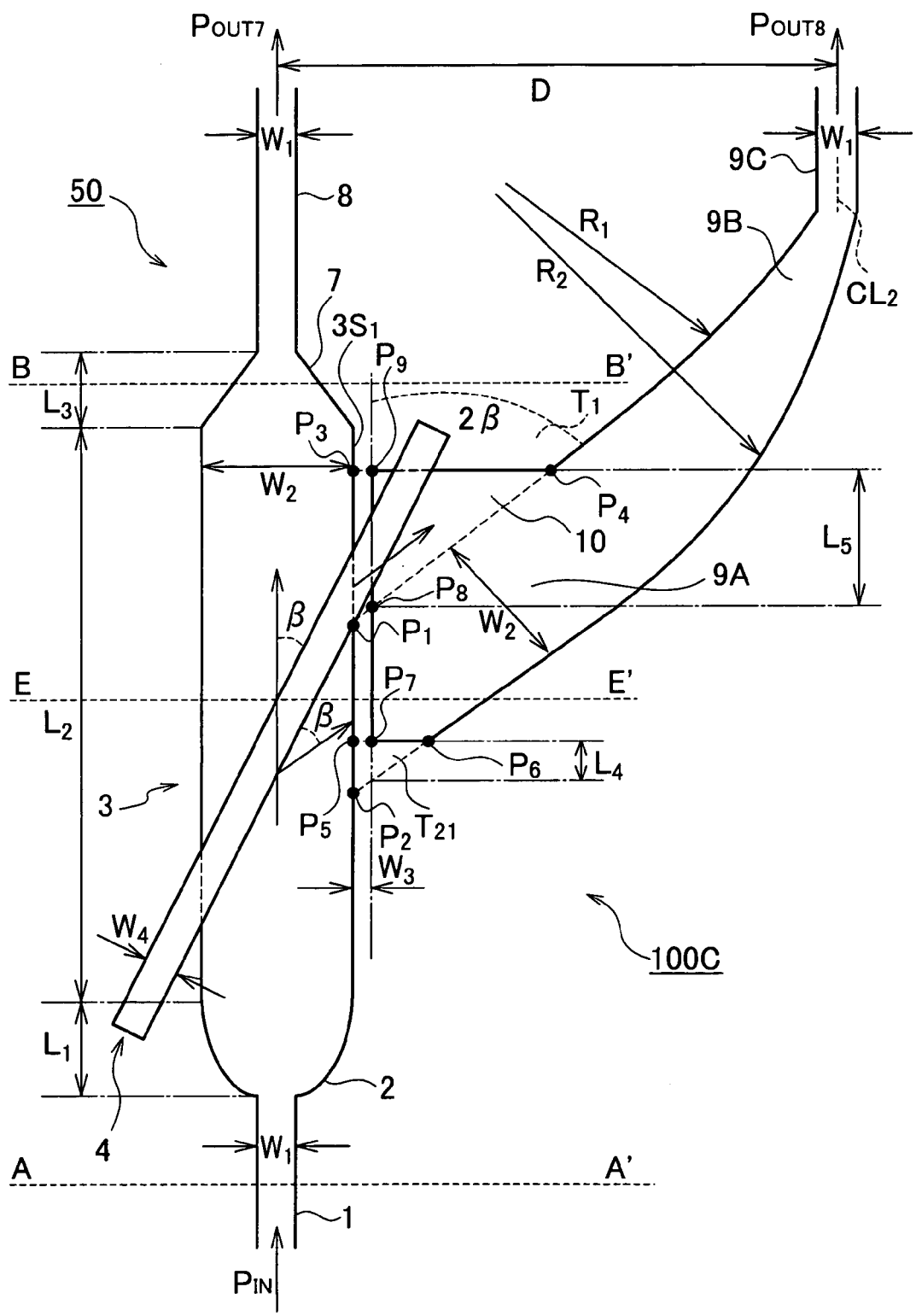
FIG. 5 is a skeleton plan view showing a thermo optical type variable optical attenuator according to a fourth embodiment of the present invention.
Figure 6:
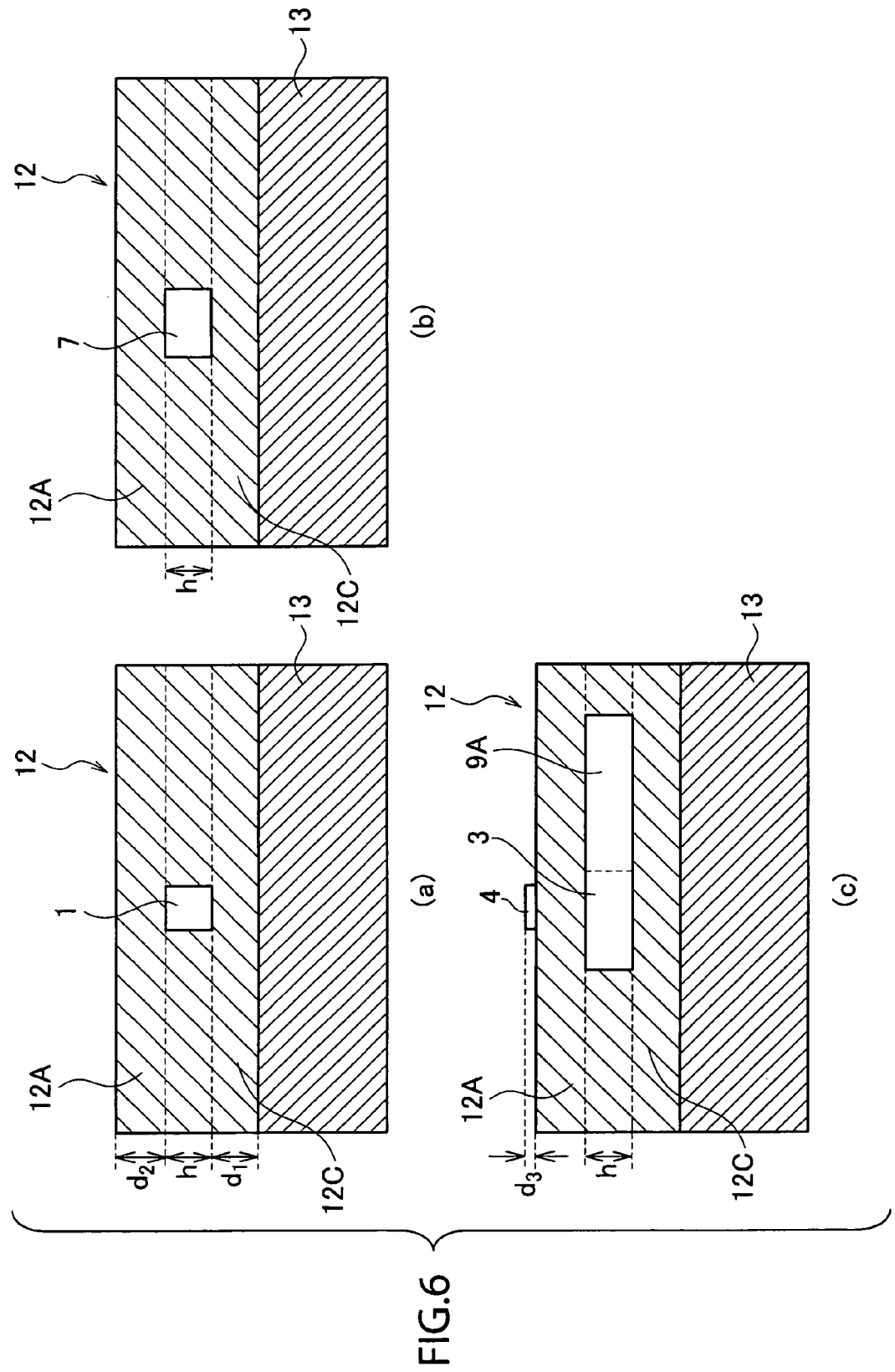
FIG. 6 (a) is a cross-sectional view of the optical waveguide in FIG. 2 along the line A–A', FIG. 6 (b) is a cross-sectional view of the optical waveguide in FIG. 2 along the line B–B' and FIG. 6 (c) is a cross-sectional view of the optical waveguide in FIG. 2 along the line C–C'.

The thermo optical type variable optical attenuator according to the first embodiment of the present invention will now be described with reference to FIGS. 2 to 6 (a)–(c). FIG. 2 is a skeleton plan view showing a thermo optical type variable optical attenuator according to a first embodiment of the present invention. FIG. 6 (a) is a cross-sectional view of the optical waveguide in FIG. 2 along the line A–A', FIG. 6 (b) is a cross-sectional view of the optical waveguide in FIG. 2 along the line B–B' and FIG. 6 (c) is a cross-sectional view of the optical waveguide in FIG. 2 along the line C–C'.

As shown in FIG. 6 (a)–(c), the thermo optical type variable optical attenuator 100 according to this embodiment consists of a waveguide 12 comprised of a material such as an optical polymer or the like (this waveguide 12 further comprising upper cladding layer 12A, waveguide core layers 1, 7, 3, 9A, lower cladding layer 12C) and a thin film heater layer comprised of a metal material e.g. Ta—Au), stacked in succession on a substrate 13 comprised of Si (silicon), glass or an optical polymer, where the waveguide core layers 1, 7, 3 and 9A are comprised of an optical polymer material having a refractive index greater than the refractive index of the cladding layers 12A and 12C.

The construction of the thermo optical type variable optical attenuator 100 according to this embodiment will now be explained with reference to FIG. 2.

The thermo optical type variable optical attenuator 100 comprises a first waveguide 50, a thin film heater 4 for controlling the strength of light propagated by the first waveguide 50 and a second waveguide 9 for guiding high order mode light arising in the first waveguide 50 due to the negative optical effect.

The first waveguide 50 further comprises a first single mode optical propagating part 1 that propagates incident light (optical power P IN), a first tapered part 2 formed in the direction of propagation of the above incident light along the first single mode optical propagating part 1, a multimode optical propagating part 3 formed in the direction of propagation of that light propagating through the first tapered part 2, a second tapered part 7 formed in the direction of propagation of the light propagated along the multimode light propagating part 3 and a second single mode light propagating part 8 formed in the direction of propagation of light through the second tapered part 7.

Here, the first single mode optical propagating part 1, the first tapered part 2, the multimode optical propagating part 3, the second tapered part 7 and the second single mode light propagating part 8 have the same central axis CL1. Further, the first single mode optical propagating part 1 and the second single mode light propagating part 8 are of the same size width W1. Moreover, the width W2 of the multimode optical propagating part 3 is larger than the width W1 of the first single mode optical propagating part 1 and the second single mode light propagating part 8 (W1<W2). Again, the length L1 of the first tapered part 2 and the length L3 of the second tapered part 7 is smaller than the length L2 of the multimode optical propagating part 3 (L1, L3<L2).

The second optical waveguide 9 provides an optical waveguide having a determined angle $2\beta$ ($0<\beta<\pi/2$) from one of the side faces 3S1 of the multimode optical propagating part 3. Accordingly, the thermo optical type variable optical attenuator 100 of this embodiment has an asymmetrical Y shape overall.

This second optical waveguide 9 further provides a multimode light, light receiving part 9A the coupling points with the side face 3S1 of which are P1 and P2, and that has a width W2 the same as the multimode optical propagating part 3, an output end part 9C (output part) having the same direction of output and the same width, W1 as the second single mode light propagating part 8 and a tapered optical waveguide tapered optical waveguide 9B, having a gently curved form, that couples the light receiving part 9A and the output end part 9C.

Further, the interval D between the center axis CL1 of the second single mode light propagating part 8 of the first waveguide 50 and the center axis CL2 of the output end part 9C of the second optical waveguide 9 should be set at ½ of the interval between adjacent waveguides of the array.

Moreover, the optical waveguide of the first tapered part 2 of the first single mode optical propagating part 1 of this embodiment, has a parabolic form. Here, the relational expression for the first tapered part 2 is: w (z)=$(2\alpha\lambda gz+ wmin\ 2)$ ½, where z ($0\leq z\leq L1$) expresses the length of the first tapered part 2 following the center axis CL1 of the first tapered part 2 when the point of origin O is set at the end face on the input side in the direction of propagation of that light input to the first tapered part 2. Accordingly, W (z) expresses the width of the first tapered part 2 for the length z, and W (0)=W1≡Wmin, W (L1)=W2≡Wmax. Again, $\lambda g=\lambda 0/nc$, where $\lambda 0$ is the propagation length of light in a vacuum, nc is the refractive index of the core waveguide layers 1, 7, 3 and 9A. Moreover, $\alpha$ is the constant fulfilling $0<\alpha<1$. If the waveguide of the first tapered part 2 of the first single mode optical propagating part 1 is a parabolic form in order to satisfy the conditions of the above described relational expression, the length of the tapered part can be made shorter.

A variety of different production methods can be used to produce the thermo optical type variable optical attenuator 100 according to this embodiment. Here, for the sake of simplicity, an explanation is provided taking the case of production processes for a semiconductor as an example.

The spin coating method is used to deposit in succession on a substrate made of Si, glass or an optical polymer material, firstly the lower part cladding 12C, then waveguide core layers 1, 7, 3 and 9A and then the upper cladding layer 12A using optical polymer material.

Generally, a photolithography method or dry etching method (reactive etching method (RIE)) can be used to form the above waveguide core layers 1, 7, 3 and 9A. Next, the metallic material (e.g. Ta—Au) is deposited using a vacuum evaporation method or sputtering method. Then, the thin film heater 4 is formed using photolithography or etching.

The basic principles of the operation of the thermo optical type variable optical attenuator 100 according to the present embodiment constructed as above will now be described.

When an electric current flows to the thin film heater 4, due to the negative optical properties of the multimode optical propagating part 3, the refractive index of the heated part of the multimode optical propagating part 3 heated via the upper cladding layer 12A is smaller in comparison to the surrounding optical waveguide core layer parts. This causes excitement of high order mode light in those heated parts.

Part of this high order mode light passes the above heated parts having the smaller refractive index and enters the second tapered part 7. The major part of that high order mode light however is reflected at that heated part at an angle of refraction β, and is guided from the side face 3S1 of the multimode optical propagating part 3 entering the light receiving part 9A of the second optical waveguide 9. This light is then diffused and emitted while being propagated along the tapered optical waveguide 9B formed in a shape that curves gently toward the output end part 9C of the second optical waveguide 9. The light attenuates to an extent that does not have an influence on the area around the output end part 9C and is emitted.

On the other hand, high order mode light in the first waveguide 50 is diffused and leaks from the second tapered part 7, while light output from the second single mode light propagating part 8 is output externally only as single mode light (optical power P OUT1). The result is that the optical power P OUT1 of this output light is small in comparison to the input optical power P IN that propagates along the first single mode optical propagating part 1.

If the current flowing to the thin film heater 4 increases there is a substantial quantity of multimode light that is totally reflected at the multimode optical propagating part 3 of the first waveguide 50 and a still greater quantity of incident light attenuates, thus the present invention operates as a variable optical attenuator by changing the intensity of current delivered to the thin film heater 4.

In this way, in the thermo optical type variable optical attenuator 100 according to this embodiment the greater part of the high order mode light that is totally reflected and excited at the heated part of the multimode optical propagating part 3 of the first waveguide 50 is smoothly taken in by the light receiving part 9A of the second optical waveguide 9 and is diffused and leaked while being propagated toward the output end part 9C.

Accordingly, where there is an array type variable optical attenuator comprising a plurality of the thermo optical type optical attenuators 100 of the present embodiment, it is possible to reduce crosstalk occurring between neighboring waveguides arising due to diffusion leakage of high order mode light to a greater degree than can be achieved using conventional technology. Where the interval between adjacent waveguides in the present embodiment is 250 μm the variable range of attenuation quantity is above 25 dB and crosstalk is below 40 dB.

Figure 3:
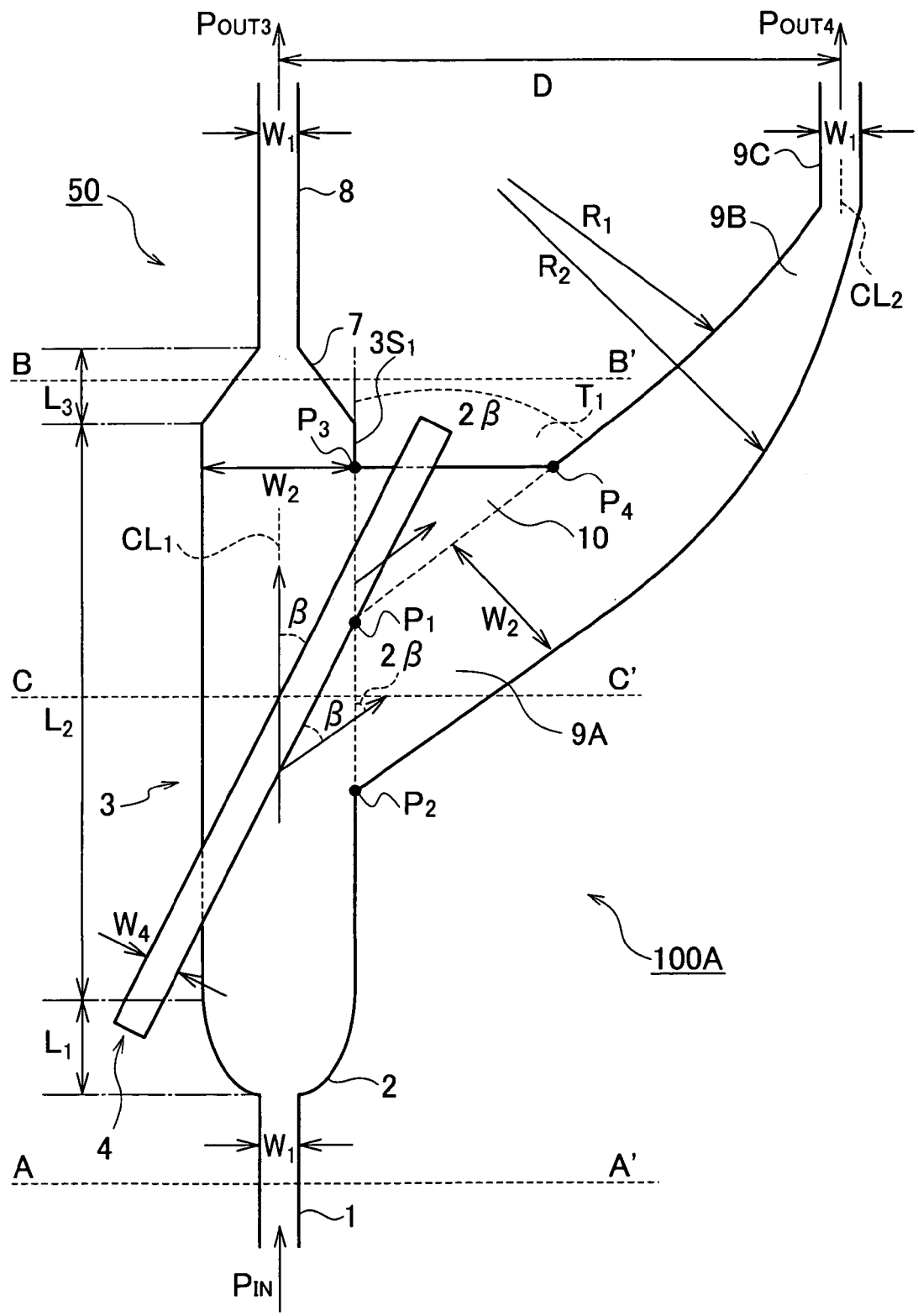
FIG. 3 is a skeleton plan view showing a thermo optical type variable optical attenuator according to a second embodiment of the present invention.

A second embodiment of a thermo optical type variable optical attenuator according to the present invention will now be described with reference to FIG. 3. FIG. 3 is a skeleton plan view showing a thermo optical type variable optical attenuator according to a second embodiment of the present invention. Like reference numerals in FIG. 3 identify those elements of this second embodiment that are the same as those of the first embodiment, thus a description of such elements is emitted and the points of difference only are elucidated hereinbelow.

The thermo optical type variable optical attenuator 100A according to this second embodiment provides an auxiliary optical waveguide 10 for taking in high order mode light excited by the thin film heater layer 4 in the form of a triangular shaped optical waveguide the vertices of which are the V-shaped regions P1, P3 and P4 intersecting with the second optical waveguide 9 that extends in a Y shape from the side face 3S1 of the multimode optical propagating part 3 of the first optical waveguide 50.

The principles of the operation of this thermo optical type variable optical attenuator 100A according to this second embodiment configured as described above will now be described.

In the same manner as applies with respect to the operations of the first embodiment, when an electric current flows to the thin film heater 4 the greater part of the high order mode light excited thereby is guided to enter the light receiving part 9A of the second optical waveguide 9, however due to the operation of the Goos-Hanchen effect, a part of this high order mode light is diffused and emitted from the V-shaped region T1 at which the multimode optical propagating part 3 and the second optical waveguide 9 intersect.

Thus, in the case of this embodiment, the triangular shaped auxiliary optical waveguide 10 is disposed in the V-shaped region T1 comprising the above apex angle 2β, and due to this, high order mode light diffused and emitted from the side face 3S1 of the multimode optical propagating part 3 is able to be taken in more smoothly at the second optical waveguide 9.

Accordingly, where there is an array type variable optical attenuator configured having a plurality of the thermo optical type variable optical attenuators 100A according to this second embodiment arranged in parallel, crosstalk arising between adjacent optical waveguides in the array due to diffusion leakage of high order mode light in the first tapered part 2 of the first waveguide 50 can be reduced to an even greater extent than in the case of the first embodiment of this invention, and of course, to an even greater extent than occurs in the case of a conventional variable optical attenuator.

A third embodiment of the thermo optical type variable optical attenuator according to the present invention will now be described with reference to FIG. 4. FIG. 4 is a skeleton plan view showing a thermo optical type variable optical attenuator according to a third embodiment of the present invention. Like reference numerals in FIG. 4 identify those elements of this third embodiment that are the same as those of the second embodiment, thus a description of such elements is emitted and the points of difference only are elucidated hereinbelow.

The thermo optical type variable optical attenuator 100B according to this third embodiment provides a waveguide notch T21 made by removing a triangle shaped part the vertices P2, P5 and P6 of which are at the lower part of the light receiving part 9A of the second optical waveguide 9 separated into a Y shape from the side face 3S1 of the multimode optical propagating part 3.

The operations of this thermo optical variable optical attenuator 100B according to this third embodiment configured as described above will now be described.

It is when there is no electric current flowing to the thin film heater layer 4 that the operations of this embodiment are most distinguishable and thus the following explanation focuses solely on this condition.

The optical waveguide 9 for guiding and diffusing and emitting high order mode light excited by the thin film heater 4 is subject to a problem of an increased degree of transmission loss as part of incident light propagating along the multimode optical propagating part 3 is leaked even when current is not flowing to the heater.

Thus, in this third embodiment wherein is provided a waveguide notch T21 made by removing a triangle part at the lower part of the second optical waveguide 9 connecting to the multimode optical propagating part 3 that has a comparatively small effect on the high order mode light received, the length of the connecting part that forms the cause of light insertion loss being short, the degree of insertion loss is able to be reduced.

Figure 7:
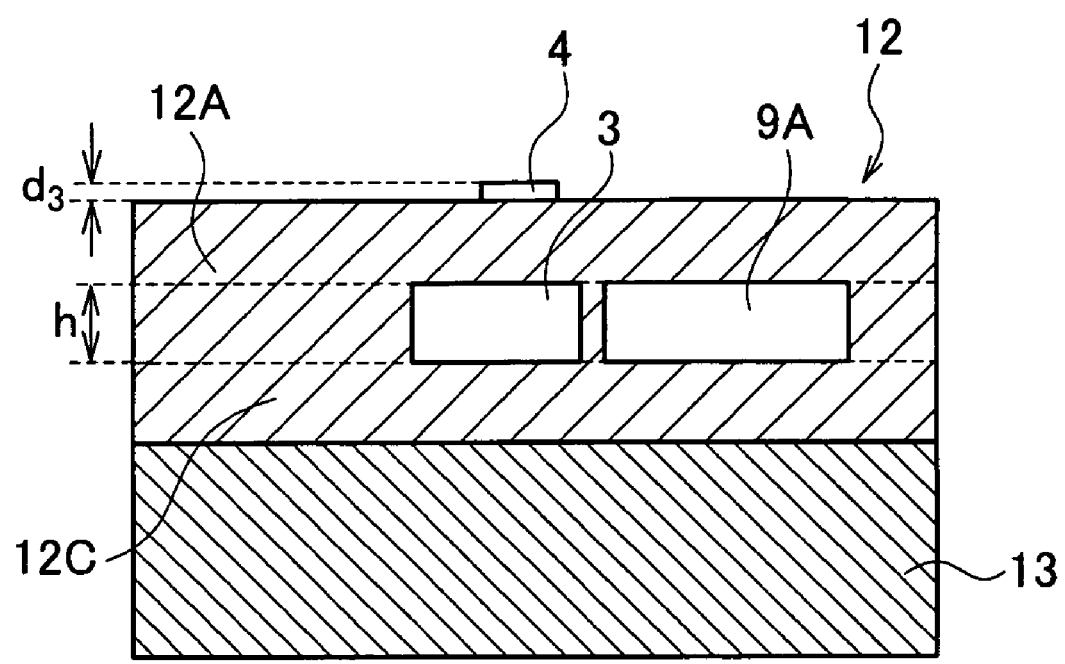
FIG. 7 is a cross-sectional view of the optical waveguide in FIG. 5 along the line E–E'.
Figure 8:
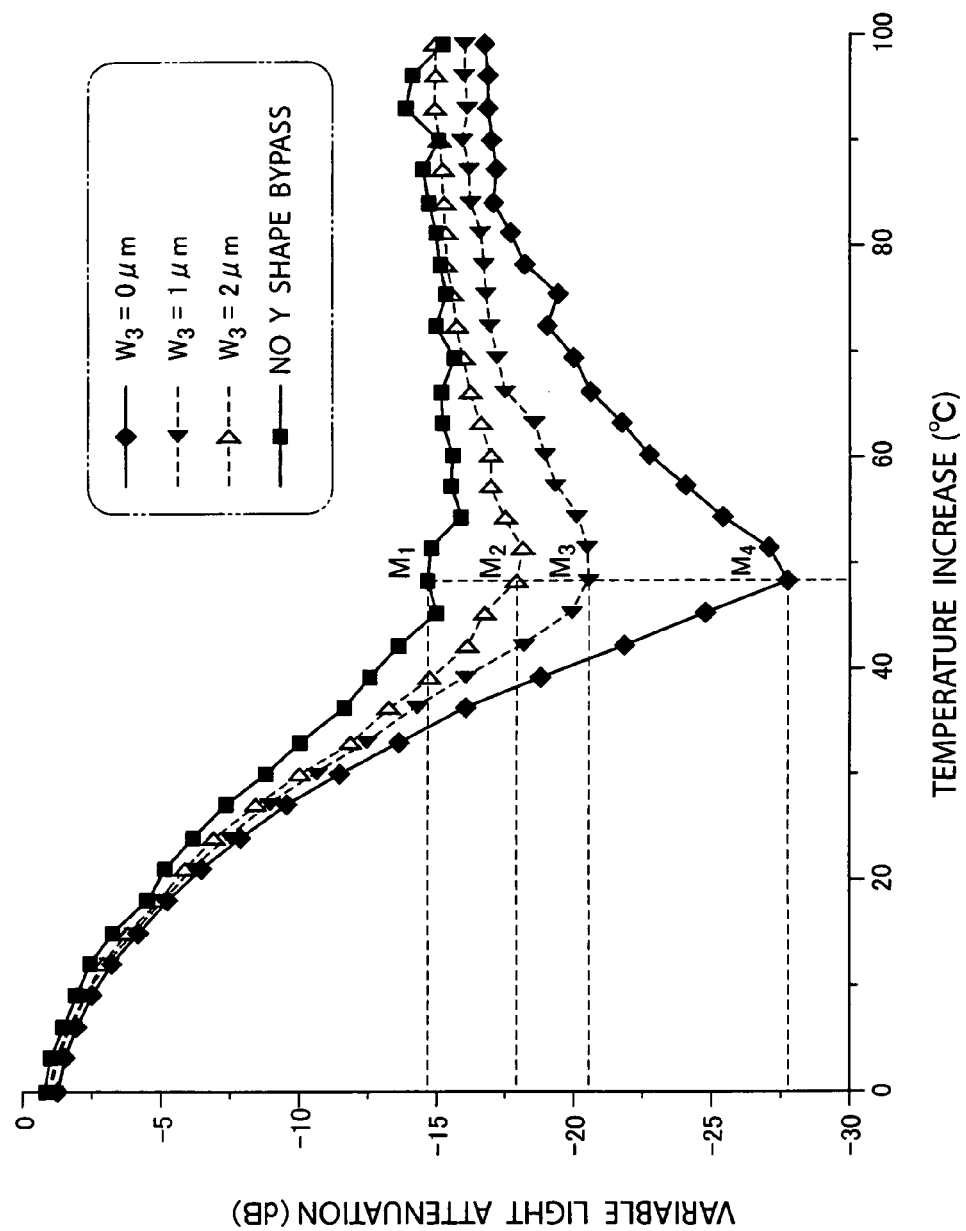
FIG. 8 is a graph of the results of a simulation of variable range of attenuation quantity produced by the fourth embodiment of the present invention.

A fourth embodiment of a thermo optical type variable optical attenuator according to the present invention will now be described with reference to FIGS. 5, 7 and 8. FIG. 5 is a skeleton plan view showing a thermo optical type variable optical attenuator according to a fourth embodiment of the present invention. FIG. 7 is a cross-sectional view of the optical waveguide in FIG. 5 along the line E–E' and FIG. 8 is a graph of the results of a simulation of variable range of attenuation quantity produced by the fourth embodiment of the present invention. Like reference numerals in FIG. 5 identify those elements of this fourth embodiment that are the same as those of the third embodiment, thus a description of such elements is emitted and the points of difference only are elucidated hereinbelow.

This fourth embodiment provides the thermo optical type variable optical attenuator of the third embodiment wherein the light receiving part 9A of the second optical waveguide 9 and the side face 3S1 of the multimode optical propagating part 3 of the first waveguide 50 are separated by a determined interval W3, facilitating optical coupling.

The principles of the operation of this thermo optical type variable optical attenuator 100C according to this fourth embodiment configured as described above will now be described.

FIG. 8 is a graph of the results of a simulation of the variable range of attenuation quantity produced by the fourth embodiment of the present invention. In FIG. 8, the horizontal axis shows the degree of temperature increase $\Delta T$ (° C.) from room temperature and the vertical axis shows variable light attenuation (dB).

The various parameters as set for this simulation are described below.

The refractive index of the first and second waveguide core layers 1, 7, 3 and 9A was 1.533. The refractive index of the cladding layers 12A and 12C was 1.526. The thickness d1 of the lower part cladding layer 12C was 10 μm. The thickness h of the first and second waveguide core layers was 7 μm. The thickness d2 of the upper cladding layer 12A was 10 μm. The width W1 of the first and second single mode light propagating parts 1 and 8 and the output end part 9C of the second optical waveguide 9 was 7 μm. The width W2 of the multimode optical propagating part 3 was 30 μm. The length L1 of the first tapered part 2 was 1100 μm. The length L2 of the multimode optical propagating part 3 was 3000 μm. The length L3 of the second tapered part 7 was 900 μm. The length L4 of the removed portion of the optical coupling part forming the removed waveguide notch T21 was 100 μm. The coupling length L5 of the light reception part of the auxiliary optical waveguide 10 was 500 μm. The distance of the interval D between the central axis CL1 of the second single mode light propagating part 8 of the first waveguide and the central axis CL2 of the output end part 9C of the second optical waveguide 9 was D=(interval between waveguides in the array)/2. The width W2 of the multimode optical propagating part 3 was 25–50 μm. The angle of inclination β of the thin film heater 4 was 1.0°–1.5°. The radii of curvature R1, R2 of the tapered optical waveguide 9B of the second optical waveguide 9 was 10 mm or above. Further Ta—Au was selected as the material for the thin film heater 4, the thickness d3 of the thin film heater 4 was 0.2 μm, the width W4 of the thin film heater 4 was 7 μm and the angle of inclination β of the thin film heater 4 was 1.4°, while the length of the thin film heater 4 was set at 3.5 mm. The first tapered part 2 of the first waveguide 50 had the form of a parabola.

FIG. 8 shows the results of a simulation of the relationship of $\Delta T$ (° C.) and variable range of attenuation quantity in the first waveguide 50 using each of the parameters set as described above. The respective curved lines shown in FIG. 8 show the results when there is no second optical waveguide 9, when the interval W3 between the side face 3S1 of the first waveguide 50 and the light receiving part 9A of the second optical waveguide 9 is 0 μm, when this interval is 1 μm and when this interval is 2 μm.

From this it can be ascertained that the variable range of attenuation quantity when there is no second optical waveguide 9 is approximately 14 dB, that when the above described interval W3 is 2 μm, this is approximately 18 dB, when that interval W3 is 1 μm, the variable range of attenuation quantity is approximately 22 dB and when the interval W3 is 0 μm, that light attenuation is 28 dB. Under all those three sets of conditions pertaining to interval W3, it is evident that the variable range of attenuation quantity is wider than when there is no second optical waveguide. Further, a comparison of those three results under the conditions of the respective differing intervals W3 reveals that when the interval W3 is 0 μm the variable range of attenuation quantity is broadest. However, comparing the transmission loss of incident light when $\Delta T=0°$ C. reveals that when the above interval W3 is 0 μm this transmission loss is approximately 0.5 dB and when that interval W3 is 2 micrometers, this loss is approximately 0.3 dB or below, these being a small degree of transmission loss.

Accordingly, the interval W3 between one of the side faces 3S1 of the first waveguide 50 and the light receiving part 9A of the second optical waveguide 9 is selectable, in response to the use objective, to achieve a trade-off between variable range of attenuation quantity and optical crosstalk.

This completes the description in detail of the embodiments of this invention however the thermo optical type variable optical attenuators and the array type variable optical attenuators described above in relation to this invention should be taken as illustrative and not restrictive.

The invention claimed is:

1. A thermo optical type variable optical attenuator that uses an optical material having negative optical effects, the optical attenuator comprising:

a first optical waveguide further comprising a first single mode light propagating part that propagates incident light, a second single mode light propagating part that propagates output light, a multimode light propagating part disposed between the first and the second single mode propagating parts, a first tapered part disposed between the first single mode propagating part and the multimode propagating part, and a second tapered part disposed between the second single mode propagating part and the multimode propagating part;

a thin-film heater arranged above the multimode light propagating part inclined at an angle β in relation to the direction of propagating of light output from the first optical waveguide; and a second optical waveguide further comprising a multimode light receiving part disposed on one side of the multimode light propagating part inclined at an angle 2β in relation to the direction of propagation of output light for receiving and bypassing high order mode light excited, diffused and emitted at the thin-film heater, and an output part that guides multimode light received at the multimode light receiving part in a direction parallel to the central axis of the second single mode light propagating part and emits that light.

2. The thermo optical variable optical attenuator according to claim 1 further comprising a triangular shaped auxiliary waveguide disposed in the V-shaped region where one side of the multimode light propagating part of the first optical waveguide and the second optical waveguide disposed in a direction inclined at an angle $2\beta$ on one side of that the multimode light propagating part intersect, for efficiently receiving and propagating the high order mode light.

3. The thermo optical variable optical attenuator according to claim 2 wherein the other side of the multimode light propagating part has a notch made by removing a triangle shaped part for reducing light propagation loss arising at the multimode light propagating part.

4. The thermo optical variable optical attenuator according to claim 1 wherein one side of the multimode light propagating part of the first optical waveguide and the multimode light receiving part of the second optical waveguide are separated having a determined interval therebetween to facilitate optical coupling.

5. The thermo optical variable optical attenuator according to claim 4 wherein the determined interval is 3 μm or below.

6. The thermo optical variable optical attenuator according to claim 1 wherein the first tapered part of the first optical waveguide has a parabolic form.

7. An array type variable optical attenuator comprising a plurality of any of the thermo optical variable optical attenuators according to claim 1 arranged in parallel.

* * * * *

UNITED STATES PATENT AND TRADEMARK OFFICE
CERTIFICATE OF CORRECTION

PATENT NO. : 7,203,411 B1  Page 1 of 1
APPLICATION NO. : 10/568062
DATED : April 10, 2007
INVENTOR(S) : Jiang et al.

It is certified that error appears in the above-identified patent and that said Letters Patent is hereby corrected as shown below:

ON THE TITLE PAGE:

The title should read:

(54) THERMAL OPTICAL TYPE VARIABLE OPTICAL ATTENUATOR AND AN ARRAY TYPE VARIABLE OPTICAL ATTENUATOR USING SAME

Signed and Sealed this

Nineteenth Day of June, 2007

JON W. DUDAS
*Director of the United States Patent and Trademark Office*